United States Patent [19]

Lück

[11] Patent Number: 4,490,086
[45] Date of Patent: Dec. 25, 1984

[54] SELF PROPELLED LOAD DISTRIBUTOR VEHICLE

[75] Inventor: Dieter G. Lück, Johannesburg, South Africa

[73] Assignee: General Mining Union Corporation Limited, Johannesburg, South Africa

[21] Appl. No.: 337,161

[22] Filed: Jan. 5, 1982

[30] Foreign Application Priority Data

Jan. 9, 1981 [ZA] South Africa ................. 81/0124
Sep. 4, 1981 [ZA] South Africa ................. 81/6142

[51] Int. Cl.³ ........................................... B60P 1/56
[52] U.S. Cl. ............................. 414/376; 295/1; 105/96.2; 105/364; 104/88
[58] Field of Search ............ 414/378, 376; 295/1, 295/31 R; 105/96, 96.2, 177, 240, 250, 364; 104/88, 157, 166, 295

[56] References Cited

U.S. PATENT DOCUMENTS

| | | | |
|---|---|---|---|
| 1,550,239 | 8/1925 | Billings et al. | 414/339 |
| 1,879,203 | 9/1932 | Guilbert et al. | 414/339 |
| 1,881,828 | 10/1932 | Millar et al. | 104/162 |
| 3,145,057 | 8/1964 | Taggart | 105/250 |
| 3,272,357 | 9/1966 | Freni | 105/364 |
| 3,272,550 | 9/1966 | Peterson | 295/31 R |
| 3,356,039 | 12/1967 | Fonden et al. | 105/177 |
| 3,556,013 | 1/1971 | Kruer et al. | 105/65 X |
| 3,712,489 | 1/1973 | Jamison | 104/157 X |
| 3,871,302 | 3/1975 | Jamison et al. | 104/295 X |
| 3,902,434 | 9/1975 | Barnard et al. | 105/250 X |
| 3,915,094 | 10/1975 | Sawada et al. | 104/166 X |
| 4,188,165 | 2/1980 | Bohme et al. | 414/694 |
| 4,190,220 | 2/1980 | Hahn et al. | 104/295 X |

FOREIGN PATENT DOCUMENTS 2250655 6/1975 France ................. 105/96.2

*Primary Examiner*—Robert J. Spar
*Assistant Examiner*—Ken Muncy
*Attorney, Agent, or Firm*—Brumbaugh, Graves, Donohue & Raymond

[57] ABSTRACT

A load distribution vehicle which is adapted to run on a rail track on or over a train of open topped cars for the purpose of loading the cars with particulate material such as mineral ore, broken rock, sand, granular food stuff or the like. The vehicle consists of a bottom discharge hopper which includes a self contained power source for driving the vehicle on its rail track and opening and closing its load discharge doors. The wheels of the vehicle are rotatable on vertical axes and are dish shaped to provide the vehicle with an abnormal transverse movement capacity on its track to enable it to negotiate sharp kinks in its track.

9 Claims, 5 Drawing Figures

FIG_1

FIG_2

SELF PROPELLED LOAD DISTRIBUTOR VEHICLE

FIELD OF THE INVENTION

This invention relates to a vehicle for distributing a load in a train of coupled open-topped vehicles such as that described in our co-pending U.S. patent application Ser. No. 337,163 filed Jan. 5, 1982 entitled "Tunnel Cleaning Train".

BACKGROUND TO THE INVENTION

A known form of tunnel end cleaning train consists of a plurality of cars which have a continuous rail system attached to their upper edges for carrying a load distribution vehicle over the cars of the train. The rail system on the cars leads from a low position in which the distribution vehicle is loaded with broken rock up a ramp and onto the rails of the first car of the train. The distribution vehicle is moved from its low-level loading position and over the rail system by means of ropes which are wound on and off cable drums at one end of the train. At least the return rope which is attached to the distributor is guided over pulleys on the cars of the train. Difficulties with the rope drive system are that rope guiding complications arise when the train is being loaded while on a curve and the coupling and uncoupling of cars in the train is severely complicated by the ropes. Yet a further difficulty with trains of this type is that the distribution vehicles are adapted for bottom discharge through doors which are operated hydraulically or pneumatically from a position remote from the distributor making the use of hoses which trail the distributor over the length of its rail system necessary. The ropes and trailing hoses severely impede the speed of operation of the distributor on its rail system and so the loading time of the train. A further problem with known distributor vehicles is that they run on either conventional rail or pulley shaped wheels which allow for little transverse displacement of the vehicle on its track without the vehicle becoming derailed and frictionally in bends decrease the rolling efficiency of the vehicle. This problem is compounded by the nature of the distributor track which consists of straight and telescopic rail sections which when the train is in a curve, particularly the sharp curves in mine railway tracks, kink sharply at the rail joints.

OBJECT OF THE INVENTION

It is the object of this invention to provide a load distribution vehicle for use in loading open-topped cars of a train of vehicles which will minimise the problems mentioned above.

SUMMARY OF THE INVENTION

A load distribution vehicle according to the invention includes an open topped container body which is adapted for bottom discharge, four wheels and a self-contained power source for driving at least one of the wheels. The body may be adapted for bottom discharge by having an opening in its underside and a door for opening and closing the opening. Preferably the door is opened and closed by means powered from the self-contained power source on the distributor. Conveniently the distributor includes two doors which are pivotally hung from opposite end walls of the body and which together are adapted to open and close the opening in the underside of the body.

Preferably the distributor wheels are rotatable on substantially vertical axes and the treads of the wheels are disc shaped. Preferably also the treads are outwardly and upwardly conical in shape and each wheel includes a central downwardly directed boss from which the tread surface extends outwardly and upwardly.

Further according to the invention the self contained power source on the distributor is a hydraulic fluid pressure accumulator which is adapted through a suitable hydraulic circuit to provide fluid under pressure to drive the distributor. An electric motor and hydraulic fluid pump are also located on the distributor for charging the accumulator with fluid under pressure when the distributor is in its loading position on the train on which it is to be used.

Still further according to the invention the hydraulic circuit through which the pressure accumulator is adapted to drive the distributor includes at least one control valve which is adapted for electrical operation. The valve may be operated remotely by means of radio control or by means of a computerised control system.

BRIEF DESCRIPTION OF THE DRAWINGS

An embodiment of the invention is now described by way of example with reference to the drawings in which:

FIG. 5 is a block diagram of one form of the electronic control arrangement for the hydraulic drive circuit of the distributor.

DETAILED DESCRIPTION OF THE DRAWINGS

Figure 1:
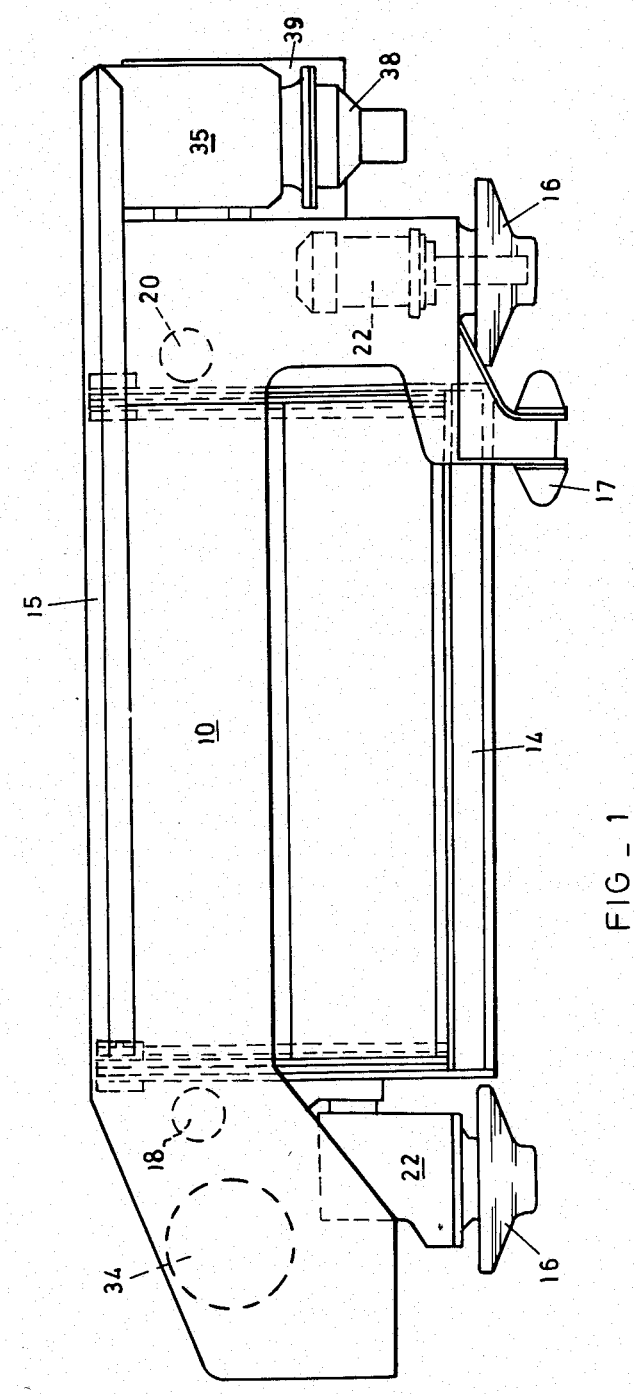
FIG. 1 is a side elevation of the distributor vehicle of the invention.
Figure 2:
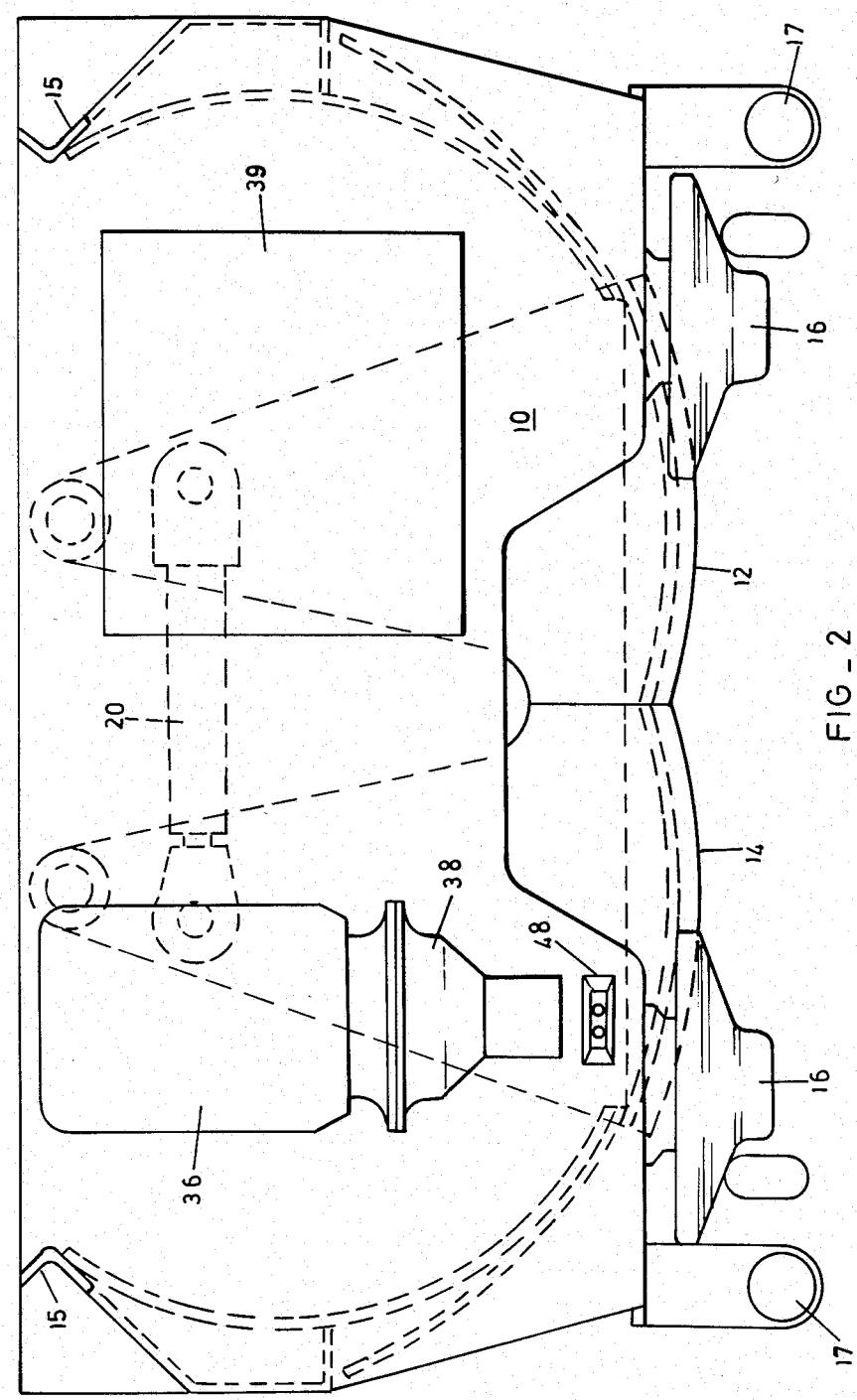
FIG. 2 is an end elevation of the distributor of FIG. 1.

The distributor of the invention is shown in FIGS. 1 and 2 of the drawings to include an open topped ore containing body 10 which has an opening in its underside, two doors 12 and 14 which are pivotally hung from opposed end walls of the load compartment for opening and closing the opening in the underside of the body and four rail wheels 16.

The doors 12 and 14 are opened and closed by hydraulic rams 18 and 20 which are pivotally attached to arms on which the doors 12 and 14 are hung on the outside of the loading compartment of the distributor.

The body 10 additionally carries rails 15 on its opposed upper edges on which a distributor loader, such as that described in our co-pending application mentioned above, can run over the distributor to load it. Rubber emergency stop buffers 17 are located on the arms on the lower edges of the body. The buffer arms also serve, as seen in FIG. 2, as de-rail preventing stops.

Figure 3:
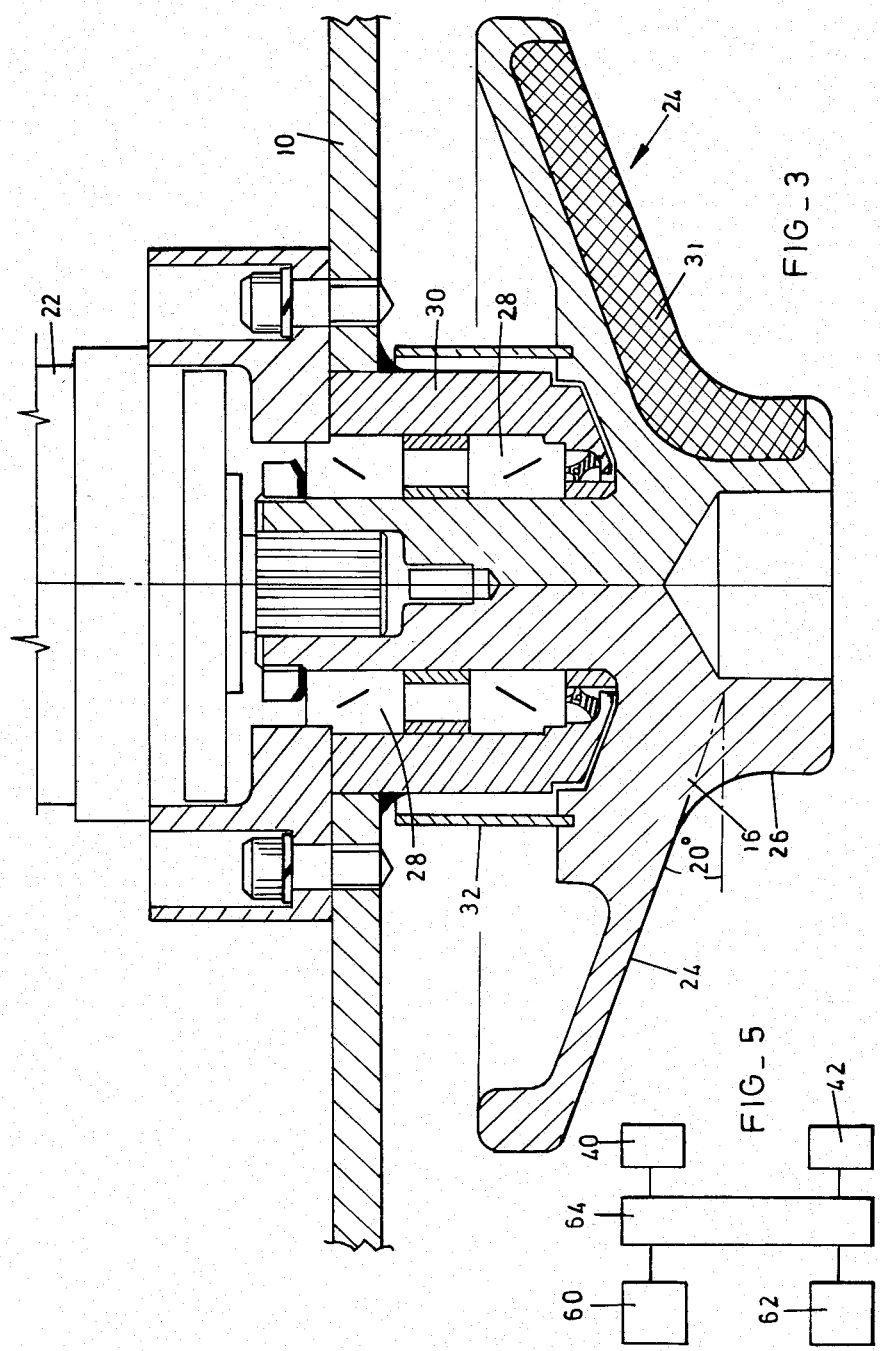
FIG. 3 is a sectional side elevation of one of the wheels of the distributor.

The wheels 16 are rotatable on substantially vertical axes by hydraulic motors 22. The wheels 16, as is more clearly seen in FIG. 3, are each dish shaped with a conical tread surface 24 and a central boss 26 onto which the tread surface flows. The fixed wheel axles are directly coupled to the output shafts of the motors 22 and are journaled for rotation in bearings 28 which are located in housings 30 on the distributor body. Dust shields 32 are attached to the wheels 16 to substantially enclose the housings 30 for bearing protection. Separate embodiments of the wheel are illustrated on either side of the centre line in the drawing. The embodiment on the left in the drawing has a plain metal tread surface and that on the right carries a tread surface insert 31 which could be made from a metal different to that from which the remaining portion of the wheel is made or from a suitable hard plastic or rubber material.

The purpose of the dish shaped wheel configuration is to improve the rolling efficiency of the wheels on the distributor track and, because the tread surfaces 24 which are substantially wider than those on similar vehicle wheels, to allow for considerably more lateral movement of the distributor in bends in its rail system than is possible with conventional wheels.

Figure 4:
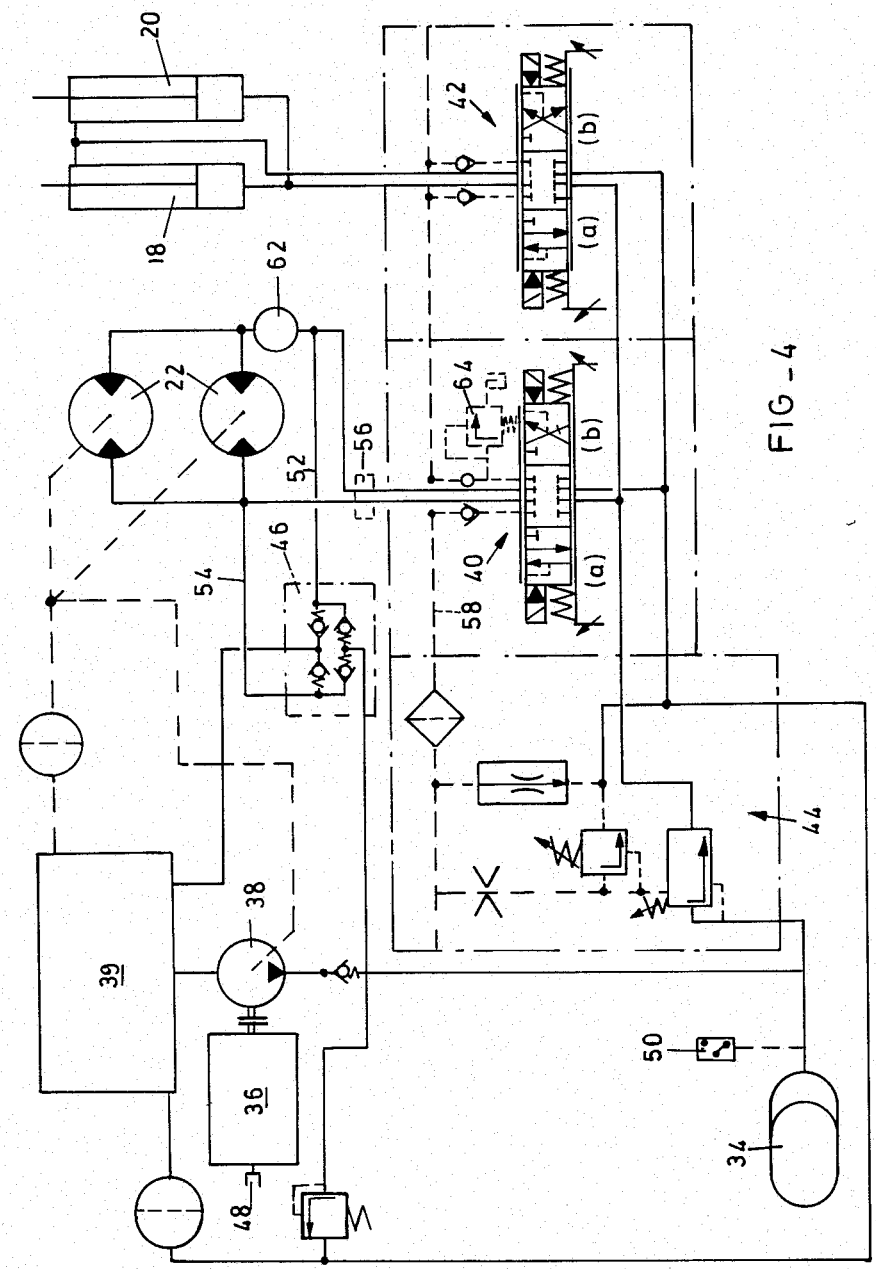
FIG. 4 is a schematic diagram of the hydraulic circuit on the distributor.

The self-contained hydraulic system of the distributor is shown in FIG. 4 to include a hydraulic fluid pressure accumulator 34 which is a large capacity (25 liter) vessel which extends across the distributor body forward of the load compartment, an electric motor 36, a hydraulic pump 38 which is coupled to the motor 36, a hydraulic fluid storage tank 39 which is pressurised to about 4 bar, load independent proportional control valves 40 and 42, a pressure balance valve indicated generally at 44, a check valve block 46, the motors 22, the rams 18 and 20 and connecting lines as illustrated in the drawing.

In use, while the distributor is being loaded with ore in the loading position on its rail system the doors 12 and 14 of the distributor are closed and an automatic coupling electrical connector 48 on the rear wall of the distributor is engaged with an electrical power source to run the motor 36. The pump 38 pumps fluid under pressure into the accumulator 34 until a pressure of about 300 bar is reached. A pressure switch 50, which senses the accumulator pressure, then switches the electrical supply to the motor 36 off. The valves 40 and 42 are at this stage in their neutral position as illustrated in the drawing.

When the distributor is fully loaded an operator remotely switches the valve 40 to position (a). The motors 22 are now connected through the valves 44 and 40 to the accumulator and the distributor is accelerated along its rail system. Valve 44 adjusts the hydraulic fluid pressure to the motors to a slightly higher value (plus or minus 6 bar) than is required to drive the motors. The distributor is decelerated to its discharge position over the train by moving valve 40 back to neutral. The motors 22 now act as pumps and pump hydraulic fluid from the tank 39 through the valve block 46 back to the accumulator 34 thus utilising braking energy partially to recharge the accumulator. When the back pressure in the system has stopped or nearly stopped the motors and so the distributor the valve 42 is moved to position (a) to apply fluid under pressure from the accumulator 34 to the rams 18 and 20 to open the doors 12 and 14 of the distributor. When the doors are open the valve 42 is returned to its neutral position to hold them open.

When the distributor load has been discharged valve 40 is switched to position (b) and the motors 22 are again driven from the accumulator in the opposite direction to return the distributor to its loading position on its rail system. The doors 18 and 20 remain open as the empty distributor is returned. To decelerate the distributor at its loading position valve 40 is again switched to neutral and the motors draw fluid from the tank 39 through the line 52 and pump it through line 54 to the accumulator 34. Back pressure on the motors from the accumulator decelerates and stops the distributor at its loading position. The valve 40 may be held slightly open to allow the distributor to creep to its loading position. The valve 42 is now switched to position (b) to actuate the rams 18 and 20 to again close the distributor doors for loading. As before, in its loading position the distributor rests on a stop and the connector 48 is again connected to a power source to drive the motor 36 to charge the accumulator.

To avoid over running of the motors 22 and so the distributor an over-centre valve 56 could be located in the lines from the valve 40 to the motors. In the event that a pressure drop occurs in a feedline to the motors the valve 56 will then automatically throttle the return line.

A pilot line arrangement 58 is connected between the valves 40 and 42 and the pressure balance valve 44. The purpose of the pilot line is to adjust the pressure ahead of the valves 40 and 42 through valve 44 so that a constant pressure drop always exists across the valves to limit the maximum torque of the hydraulic motors on the return trip of the empty distributor to its loading position. Additionally, the pilot line pressure on the (b) side of the valve 40 is reduced to a lower pressure by means of a relief valve 64 to avoid skidding of the empty distributor wheels even under maximum accumulator pressure.

The valves 40 and 42 could be solenoid operated by radio control by an operator remote from the distributor. Alternatively, the distributor operation could be automatic and controlled by a computer located on the distributor. Such a system is illustrated schematically in FIG. 5. The system consists of an ultra sonic transmitter and receiver 60, a hydraulic fluid volumetric counter 62 (FIG. 4), a computerised arrangement 64 for analysing the information from the transceiver 60 and counter 62 and for operating the valves 40 and 42 in dependence on the computed information. The volumetric counter could provide information on distance and speed and the ultra sonic transceiver information on the position of the distributor on its rail system and status of the load in the rail cars being loaded by the distributor as well as to provide comparative and correcting information for the volumetric counter.

The invention is not limited to the precise constructional details as herein described. For example the motor 36 and pump 38 could be eliminated by driving one of the wheels while the distributor is being loaded and causing its motor to act as a pump to charge the accumulator from the tank 39. The hydraulic circuit of FIG. 4 could also be replaced by that described in our "TUNNEL CLEANING TRAIN" patent application or in fact by any suitable self-contained drive system. Additionally, the body 10 of the distributor could be of any suitable bottom discharge configuration.

I claim:

1. A self-propelled load distributor rail vehicle comprising an open top body having a discharge opening in its underside, at least one door for opening and closing the opening in the underside of the body, means on the body for opening and closing the door, four rail wheels which are rotatable about vertical axes with each wheel including an inverted substantially conical tread surface which is outwardly and upwardly inclined from a central boss which during straight travel of the vehicle is located on the inside of and spaced from the side of the rail which carries it so that the vehicle may move transversely to the rails in a curve while the tread surfaces of the wheels remain in contact with the rails, and hydraulic means on the body for driving at least one of the wheels and operating the door opening and closing means, the hydraulic means including a hydraulic wheel driving motor, a hydraulic fluid pressure accumulator, a hydraulic fluid reservoir, a hydraulic control circuit for controlling operation of the door opening and closing means and the wheel-driving motor including means providing signals for indicating the location of the vehicle, means providing signals for indicating an empty or loaded condition of the vehicle, valve means responsive to signals from the location indicating means and the load indicating means for controlling the operation of the hydraulic means, and hydraulic pump means for charging the accumulator with hydraulic fluid under pressure from the reservoir when the vehicle is stationed at a loading position.

2. A vehicle as claimed in claim 1 in which one pair of wheels is attached to and located forwardly of the body and the remaining pair is attached to and located rearwardly of the body.

3. A vehicle as claimed in claim 1 in which the tread surface of each wheel is upwardly inclined from the boss at an angle to the horizontal of between 15° and 25°.

4. A vehicle as claimed in claim 3 in which the angle of inclination of the tread surfaces of the wheels is 20°.

5. A vehicle as claimed in claim 1 including two doors which are pivotally hung from opposite end walls of the body and which together are adapted to open and close the opening in the underside of the body.

6. A vehicle as claimed in claim 1 in which the hydraulic circuit includes means for regeneratively recharging the accumulator during braking of the vehicle.

7. A vehicle as claimed in claim 1 in which the door opening and closing means includes at least one hydraulic ram which is operated from the accumulator through the hydraulic control circuit.

8. A vehicle as claimed in claim 1 in which the hydraulic control circuit includes at least one control valve which is electrically operable by radio-control.

9. A vehicle as claimed in claim 1 including computerized control means for operating the hydraulic control circuit.

* * * * *